(12) United States Patent
Cairns et al.

(10) Patent No.: US 7,195,062 B2
(45) Date of Patent: Mar. 27, 2007

(54) MEASUREMENT-WHILE-DRILLING ASSEMBLY USING REAL-TIME TOOLFACE ORIENTED MEASUREMENTS

(75) Inventors: Paul G. Cairns, Houston, TX (US);
Sergey V. Efremov, Houston, TX (US);
David M. Schneider, Lansdowne, VA (US); Sassan Dehlavi, Houston, TX (US); Robert A. Estes, Tomball, TX (US); Samuel R. Bell, Tomball, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/322,050

(22) Filed: Dec. 29, 2005

(65) Prior Publication Data

US 2006/0149477 A1 Jul. 6, 2006

Related U.S. Application Data

(63) Continuation of application No. 10/629,268, filed on Jul. 29, 2003, now Pat. No. 7,000,700.

(60) Provisional application No. 60/408,308, filed on Sep. 5, 2002, provisional application No. 60/399,741, filed on Jul. 30, 2002.

(51) Int. Cl.
*E21B 45/00* (2006.01)
*G06F 19/00* (2006.01)

(52) U.S. Cl. ............................. 166/255.2; 166/250.11; 702/6

(58) Field of Classification Search ........... 166/250.11, 166/255.1, 66, 72, 40–50
See application file for complete search history.

(56) References Cited

U.S. PATENT DOCUMENTS

| | | | |
|---|---|---|---|
| 4,542,647 A | 9/1985 | Molnar | |
| 5,091,644 A | 2/1992 | Minette | |
| 5,325,714 A | 7/1994 | Lende et al. | |
| 5,678,643 A | 10/1997 | Robbins et al. | |
| 5,899,958 A | 5/1999 | Dowell et al. | |
| 6,047,239 A | 4/2000 | Berger et al. | |
| 6,088,294 A | 7/2000 | Leggett, III et al. | |
| 6,147,496 A | 11/2000 | Strack et al. | |
| 6,215,120 B1 | 4/2001 | Gadeken et al. | |
| 6,307,199 B1 | 10/2001 | Edwards et al. | |
| 6,347,282 B2 | 2/2002 | Estes et al. | |
| 6,443,228 B1 | 9/2002 | Aronstam et al. | |
| 6,453,239 B1 | 9/2002 | Shirasaka et al. | |

*Primary Examiner*—Frank Tsay
(74) *Attorney, Agent, or Firm*—Madan, Mossman & Sriram, P.C.

(57) ABSTRACT

This invention provides a measurement-while-drilling (MWD) downhole assembly for use in drilling boreholes which utilizes directional formation evaluation devices on a rotating assembly in conjunction with toolface orientation sensors. The data from the toolface orientation sensors are analyzed by a processor and toolface angle measurements are determined at defined intervals. Formation evaluation sensors operate substantially independently of the toolface orientation sensors and measurements of the formation evaluation sensors are analyzed in combination with the determined toolface angle to obtain formation parameters.

15 Claims, 6 Drawing Sheets

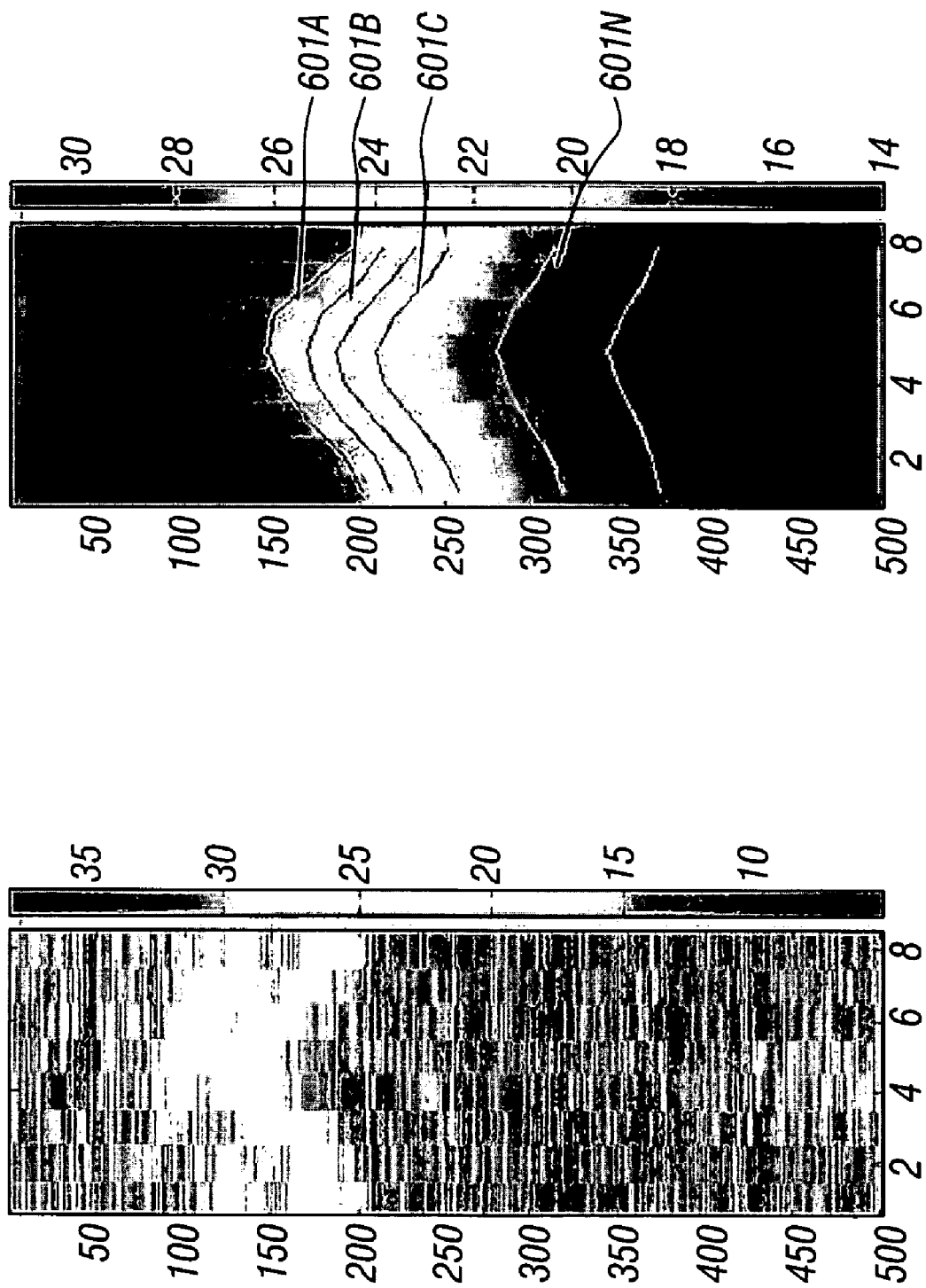

MEASUREMENT-WHILE-DRILLING ASSEMBLY USING REAL-TIME TOOLFACE ORIENTED MEASUREMENTS

CROSS REFERENCES TO RELATED APPLICATIONS

This application is a continuation of U.S. patent application Ser. No. 10/629,268 filed on Jul. 29, 2003 now U.S. Pat. No. 7,000,700 (the Parent application). The parent application claimed priority from U.S. Provisional Patent Application Ser. No. 60/399,741 filed on Jul. 30, 2002 and U.S. Provisional Patent Application Ser. No. 60/408,308 filed on Sep. 5, 2002.

FIELD OF THE INVENTION

This invention relates generally to assemblies for making toolface oriented measurements within a borehole and processing of such measurements to determine parameters of interest of materials around the borehole. The invention is described in the context of measurement-while-drilling applications for obtaining formation properties but the principles of analysis are equally applicable to measurements made with a wireline.

BACKGROUND OF THE INVENTION

To obtain hydrocarbons such as oil and gas, wellbores (also called the boreholes) are drilled by rotating a drill bit attached at the end of a drilling assembly generally called the "bottom hole assembly" or the "drilling assembly." A large portion of the current drilling activity involves drilling highly deviated or substantially horizontal wellbores to increase the hydrocarbon production and/or to withdraw additional hydrocarbons from the earth's formations. The wellbore path of such wells is carefully planned before drilling such wellbores using seismic maps of the earth's subsurface and well data from previously drilled wellbores in the associated oil fields. Due to the very high cost of drilling such wellbores and the need precisely to place such wellbores in the reservoirs, it is essential continually to determine the position and direction of the drilling assembly and thus the drill bit during drilling of the wellbores. Such information is used, among other things, to monitor and adjust the drilling direction of the wellbores.

In drilling assemblies used until recently, the directional package commonly includes a set of accelerometers and a set of magnetometers, which respectively measure the earth's gravity and magnetic field. The drilling assembly is held stationary during the taking of the measurements from the accelerometers and the magnetometers. The toolface and the inclination angle are determined from the accelerometer measurements. The azimuth is then determined from the magnetometer measurements in conjunction with the tool face and inclination angle.

The earth's magnetic field varies from day to day, which causes corresponding changes in the magnetic azimuth. The varying magnetic azimuth compromises the accuracy of the position measurements when magnetometers are used. Additionally, it is not feasible to measure the earth's magnetic field in the presence of ferrous materials, such as casing and drill pipe. Gyroscopes measure the rate of the earth's rotation, which does not change with time nor are the gyroscopes adversely affected by the presence of ferrous materials. Thus, in the presence of ferrous materials the gyroscopic measurements can provide more accurate azimuth measurements than the magnetometer measurements.

U.S. Pat. No. 6,347,282 to Estes et al having the same assignee as the present application and the contents of which are fully incorporated herein by reference, discloses a measurement-while-drilling (MWD) downhole assembly for use in drilling boreholes that utilizes gyroscopes, magnetometers and accelerometers for determining the borehole inclination and azimuth during the drilling of the borehole. The downhole assembly includes at least one gyroscope that is rotatably mounted in a tool housing to provide signals relating to the earth's rotation. A device in the tool can rotate the gyroscope and other sensors on the tool at any desired angle. This ability to rotate the sensors is important in determining bias in the sensors and eliminating the effects of the bias.

U.S. Pat. No. 5,091,644 to Minette having the same assignee as the present application teaches a method for analyzing data from a measurement-while-drilling (MWD) gamma ray density logging tool which compensates for rotations of the logging tool (along with the rest of the drillstring) during measurement periods. In accordance with the method disclosed therein, the received signal is broken down into a plurality of sections. In a preferred embodiment, the Minette invention calls for the breaking of the signal from the formation into four different sections: top, bottom, right, left. As the tool rotates, it passes through these four quadrants. Each time it passes a boundary, a counter is incremented, pointing to the next quadrant. This allows for dividing the data into four spectra for each detector. Each of these four spectra will be obtained for ¼th of the total acquisition time.

U.S. Pat. No. 6,307,199 to Edwards et al teaches the use of a density gamma ray logging device in which data from different "azimuthal" sectors are combined to give an interpretation of formation dip. The primary emphasis in both the Minette and Edwards patent is to correct the density measurements for the effects of standoff; the sensors themselves are not specifically designed for "azimuthal" sensitivity.

U.S. Pat. No. 6,215,120 to Gadeken et al. discloses the use of "azimuthally" focused gamma ray sensors on a logging tool for detecting "azimuthal" variations in the gamma ray emission from earth formations.

We digress briefly on a matter of terminology. In surveying, the term "azimuth" usually refers to an angle in a horizontal plane, usually measured from north: when referenced to magnetic north, it may be called magnetic azimuth and when referenced to true north, it is usually simply termed azimuth. It would be clear based on this definition that all measurements made in a highly deviated borehole or a horizontal borehole would be made with substantially the same azimuth. Accordingly, in the present application, we use the more accurate term "tool face angle" to define a relative orientation in a plane orthogonal to the borehole axis. With this definition, the Minette, Edwards and Gadeken patents are really making measurements over a variety of tool face angles.

Common to the Minette, Edwards and Gadeken patents is the use of a controller that keeps track of the rotating sensor assembly and controls the acquisition of data based on sector boundaries in the tool face angle. While this may not be difficult to do for the case of a single directionally sensitive sensor, the problem becomes much more complicated when a plurality of different types of sensors are conveyed as part of a bottom hole assembly. It is difficult, if not impossible, for a single controller to keep track of a plurality of sensor assemblies during rotation of the downhole assembly and control the operation of a plurality of assemblies. It would be desirable to have an apparatus and a method that efficiently controls data acquisition and possibly processing with a plurality of rotating sensors in a downhole device. The present invention satisfies this need.

SUMMARY OF THE INVENTION

One embodiment of the present invention includes a rotatable downhole assembly adapted for conveying in a borehole and determining a parameter of interest of a medium near to the borehole. The downhole assembly includes a first sensing device such as a gyroscope, a magnetometer, and/or an accelerometer, for providing a measurement indicative of the toolface angle of the downhole assembly, and an associated processor. The downhole assembly also includes a directional evaluation device for providing measurements indicative of a parameter of interest of the medium. The directional evaluation device is associated with a second processor. The first processor provides processed data about the toolface orientation to a common bus operatively connected to the first processor and the second processor. In a preferred embodiment of the invention, a gyroscope is used to provide information about the location of the assembly. The assembly may be conveyed on a drillstring, coiled tubing or on a wireline.

In a preferred embodiment of the invention, the directional device is a formation evaluation device. One or more gamma ray sensors may be used. The formation evaluation device may be operated independently of the orientation sensor. With this arrangement, a plurality of formation evaluation sensors may be used. Subsequent processing relates the measurements of the formation evaluation sensors to toolface angle and provides information about downhole parameters.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein:

FIG. 10 shows an example of processing of the data using the method of the present invention

DETAILED DESCRIPTION OF THE PREFERRED EMBODIMENTS

Figure 1:
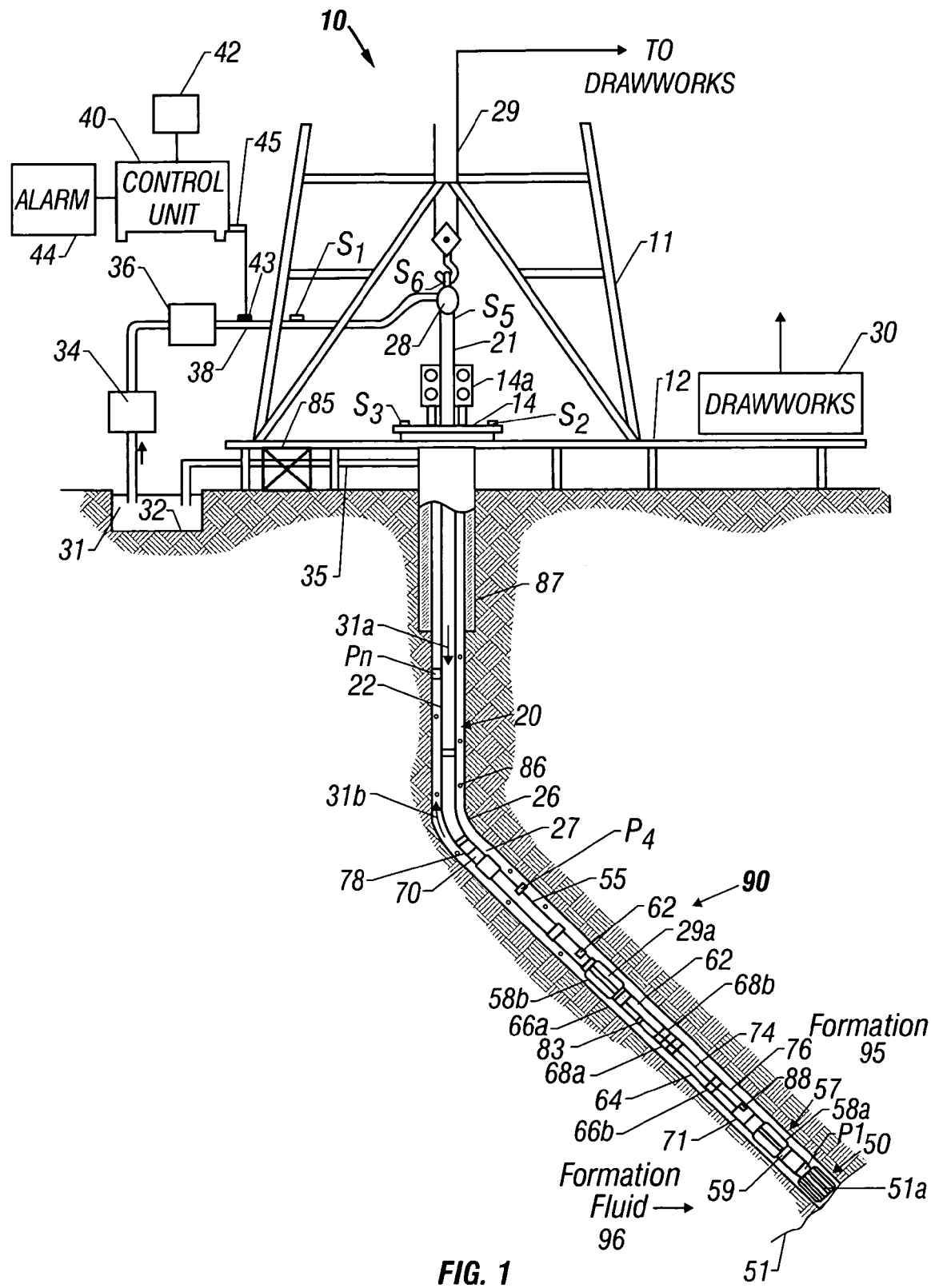
FIG. 1 (prior art) shows a schematic diagram of a drilling system that includes the apparatus of the current invention in a measurement-while-drilling embodiment.

The present invention is described with reference to a drilling assembly, although many of the methods of the present invention are also applicable with logging tools conveyed on a wireline and may also be used in cased boreholes. FIG. 1 shows a schematic diagram of an exemplary drilling system 10 such as that disclosed by Estes. The drilling system has a bottom hole assembly (BHA) or drilling assembly 90 that includes gyroscope. For some of the applications of the present invention, a gyroscope is not essential. The BHA 90 is conveyed in a borehole 26. The drilling system 10 includes a conventional derrick 11 erected on a floor 12 which supports a rotary table 14 that is rotated by a prime mover such as an electric motor (not shown) at a desired rotational speed. The drill string 20 includes a tubing (drill pipe or coiled-tubing) 22 extending downward from the surface into the borehole 26. A drill bit 50, attached to the drill string 20 end, disintegrates the geological formations when it is rotated to drill the borehole 26. The drill string 20 is coupled to a drawworks 30 via a kelly joint 21, swivel 28 and line 29 through a pulley (not shown). Drawworks 30 is operated to control the weight on bit ("WOB"), which is an important parameter that affects the rate of penetration ("ROP"). A tubing injector 14a and a reel (not shown) are used as instead of the rotary table 14 to inject the BHA into the wellbore when a coiled-tubing is used as the conveying member 22. The operations of the drawworks 30 and the tubing injector 14a are known in the art and are thus not described in detail herein.

During drilling, a suitable drilling fluid 31 from a mud pit (source) 32 is circulated under pressure through the drill string 20 by a mud pump 34. The drilling fluid passes from the mud pump 34 into the drill string 20 via a desurger 36 and the fluid line 38. The drilling fluid 31 discharges at the borehole bottom 51 through openings in the drill bit 50. The drilling fluid 31 circulates uphole though the annular space 27 between the drill string 20 and the borehole 26 and returns to the mud pit 32 via a return line 35 and drill cutting screen 85 that removes the drill cuttings 86 from the returning drilling fluid 31b. A sensor $S_1$ in line 38 provides information about the fluid flow rate. A surface torque sensor $S_2$ and a sensor $S_3$ associated with the drill string 20 respectively provide information about the torque and the rotational speed of the drill string 20. Tubing injection speed is determined from the sensor $S_5$, while the sensor $S_6$ provides the hook load of the drill string 20.

In some applications the drill bit 50 is rotated by only rotating the drill pipe 22. However, in many other applications, a downhole motor 55 (mud motor) is disposed in the drilling assembly 90 to rotate the drill bit 50 and the drill pipe 22 is rotated usually to supplement the rotational power, if required, and to effect changes in the drilling direction. In either case, the ROP for a given BHA largely depends on the WOB or the thrust force on the drill bit 50 and its rotational speed.

The mud motor 55 is coupled to the drill bit 50 via a drive disposed in a bearing assembly 57. The mud motor 55 rotates the drill bit 50 when the drilling fluid 31 passes through the mud motor 55 under pressure. The bearing assembly 57 supports the radial and axial forces of the drill bit 50, the downthrust of the mud motor 55 and the reactive upward loading from the applied weight on bit. A lower stabilizer 58a coupled to the bearing assembly 57 acts as a centralizer for the lowermost portion of the drill string 20.

A surface control unit or processor 40 receives signals from the downhole sensors and devices via a sensor 43 placed in the fluid line 38 and signals from sensors $S_1$–$S_6$ and other sensors used in the system 10 and processes such signals according to programmed instructions provided to the surface control unit 40. The surface control unit 40 displays desired drilling parameters and other information on a display/monitor 42 that is utilized by an operator to control the drilling operations. The surface control unit 40 contains a computer, memory for storing data, recorder for recording data and other peripherals. The surface control unit 40 also includes a simulation model and processes data according to programmed instructions. The control unit 40 is preferably adapted to activate alarms 44 when certain unsafe or undesirable operating conditions occur.

The BHA may also contain formation evaluation sensors or devices for determining resistivity, density and porosity of the formations surrounding the BHA. A gamma ray device for measuring the gamma ray intensity and other nuclear and non-nuclear devices used as measurement-while-drilling devices are suitably included in the BHA 90. As an example, FIG. 1 shows a resistivity measuring device 64. It provides signals from which resistivity of the formation near or in front of the drill bit 50 is determined. The resistivity device 64 has transmitting antennae 66a and 66b spaced from the receiving antennae 68a and 68b. In operation, the transmitted electromagnetic waves are perturbed as they propagate through the formation surrounding the resistivity device 64. The receiving antennae 68a and 68b detect the perturbed waves. Formation resistivity is derived from the phase and amplitude of the detected signals. The detected signals are processed by a downhole computer 70 to determine the resistivity and dielectric values.

An inclinometer 74 and a gamma ray device 76 are suitably placed along the resistivity measuring device 64 for respectively determining the inclination of the portion of the drill string near the drill bit 50 and the formation gamma ray intensity. Any suitable inclinometer and gamma ray device, however, may be utilized for the purposes of this invention. In addition, position sensors, such as accelerometers, magnetometers or a gyroscopic devices may be disposed in the BHA to determine the drill string azimuth, true coordinates and direction in the wellbore 26. Such devices are known in the art and are not described in detail herein.

In the above-described configuration, the mud motor 55 transfers power to the drill bit 50 via one or more hollow shafts that run through the resistivity measuring device 64. The hollow shaft enables the drilling fluid to pass from the mud motor 55 to the drill bit 50. In an alternate embodiment of the drill string 20, the mud motor 55 may be coupled below resistivity measuring device 64 or at any other suitable place. The above described resistivity device, gamma ray device and the inclinometer are preferably placed in a common housing that may be coupled to the motor. The devices for measuring formation porosity, permeability and density (collectively designated by numeral 78) are preferably placed above the mud motor 55. Such devices are known in the art and are thus not described in any detail.

As noted earlier, a large portion of the current drilling systems, especially for drilling highly deviated and horizontal wellbores, utilize coiled-tubing for conveying the drilling assembly downhole. In such application a thruster 71 is deployed in the drill string 90 to provide the required force on the drill bit. For the purpose of this invention, the term weight on bit is used to denote the force on the bit applied to the drill bit during the drilling operation, whether applied by adjusting the weight of the drill string or by thrusters. Also, when coiled-tubing is utilized the tubing is not rotated by a rotary table, instead it is injected into the wellbore by a suitable injector 14a while the downhole motor 55 rotates the drill bit 50.

Figure 2A:
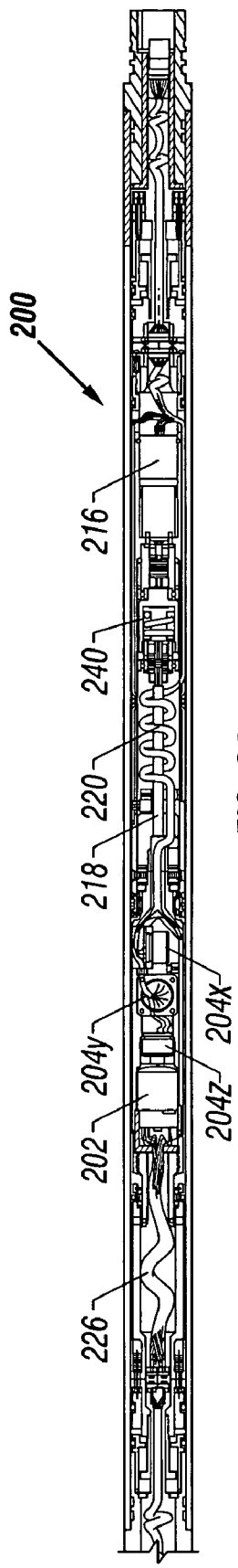
FIG. 2a, 2b (prior art) shows a schematic diagram of a portion of the bottomhole assembly with a set of gyroscopes and a corresponding set of accelerometers according to a preferred embodiment of the present invention.

A number of sensors are also placed in the various individual devices in the drilling assembly. For example, a variety of sensors are placed in the mud motor power section, bearing assembly, drill shaft, tubing and drill bit to determine the condition of such elements during drilling and to determine the borehole parameters. The preferred manner of deploying certain sensors in drill string 90 will now be described. The actual BHA utilized for a particular application may contain some or all of the above described sensors. For the purpose of this invention any such BHA could contain one or more gyroscopes and a set of accelerometers (collectively represented herein by numeral 88) at a suitable location in the BHA 90. A preferred configuration of such sensors is shown in FIG. 2a.

FIG. 2 is a schematic diagram showing a sensor section 200 containing a gyroscope 202 and a set of three accelerometers 204x, 204y and 204z disposed at a suitable location in the bottomhole assembly (90 in FIG. 1) according to one preferred embodiment of the present invention. The gyroscopes 202 may be a single axis gyroscope or a two-axis gyroscope. In vertical and low inclination weilbores, an x-axis and a y-axis gyroscope are deemed sufficient for determining the azimuth and toolface with respect to the true north. The configuration shown in FIG. 2 utilizes a single two-axis (x-axis and y-axis) gyroscope that provides outputs corresponding to the earth's rate of rotation in the two axis perpendicular to the borehole axis or the bottomhole assembly longitudinal axis, referred to herein as the z-axis. The sensor 202 thus measures the earth's rotation component in the x-axis and y-axis. The accelerometers 204x, 204y and 204z measure the earth's gravity components respectively along the x, y, and z axes of the bottomhole assembly 90.

The gyroscope 202 and accelerometers 204x–204z are disposed in a rotating chassis 210 that rotates about the radial bearings 212a–212b in a fixed or non-rotating housing 214. An indexing drive motor 216 coupled to the rotating chassis 210 via a shaft 218 can rotate the chassis 210 in the bottomhole assembly 90 about the z-axis, thus rotating the gyroscopes 202 from one mechanical position to another position by any desired rotational angle. A stepper motor is preferred as the indexing drive motor 216 because stepper motors are precision devices and provide positive feedback about the amount of rotation. Any other mechanism, whether electrically-operated, hydraulically-operated or by any other desired manner, may be utilized to rotate the gyroscopes within the bottomhole assembly 90. The gyroscope 202 may be rotated from an initial arbitrary position to a mechanical stop (not shown) in the tool or between two mechanical stops or from an initial peak measurement to a second position as described later. The rotational angle corresponding to a particular axis is selectable.

Although FIG. 2 shows a single two axis gyroscope, a separate gyroscope may be utilized for each axis. A wiring harness 226 provides power to the gyroscope 202 and accelerometers 204x, 204y, 204z. The wiring harness 226 transmits signals from the gyroscope and accelerometers to the processor in the bottomhole assembly 90. Similarly, a suitable wiring harness 220 provides power and signal linkage to the stepper motor 216 and additional downhole equipment. A spring loaded torque limiter 240 may be used to prevent inertial loading caused by drillstring rotation from damaging the gearbox of the stepper motor 216.

Figure 2B:
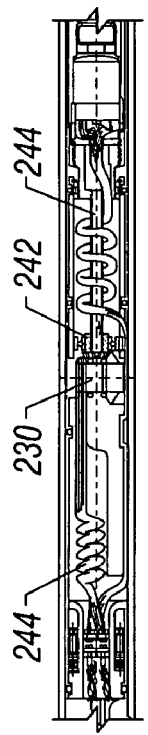

In addition a second two-axis (x-axis and z-axis) gyroscope 230 may be rotatably mounted in the bottomhole assembly 90 in a rotating chassis or in any other manner to measure the rate of rotation in the z-axis and the x-axis, as shown in FIG. 2b. The sensor 230 could be rotated about the y-axis using a bevel gear 242 and a shaft linkage 244 to the rotating chassis 210, thus eliminating the need for an additional motor. The wiring harness 244 for the y-axis gyro 230 must be spooled around the gyro to accommodate the space available in a small diameter housing.

Figure 3:
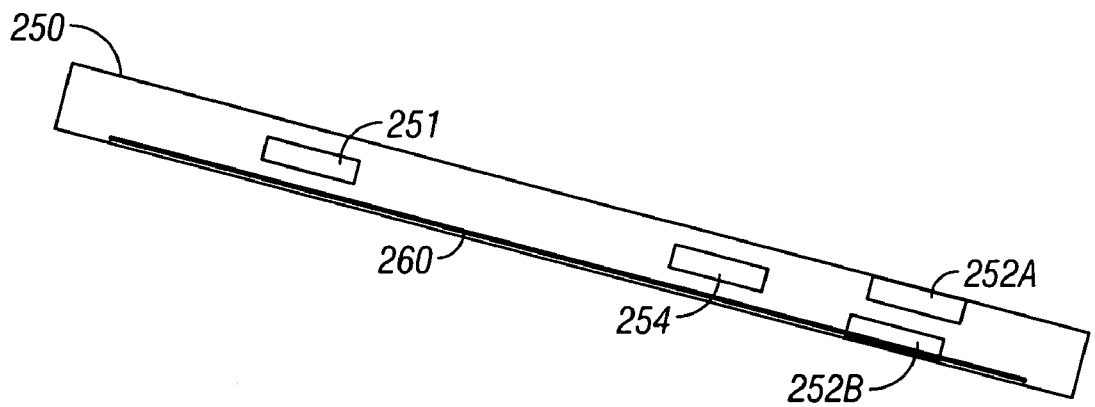
FIG. 3 shows an orientation sensor assembly and a dual detector gamma ray sensor.

Turning now to FIG. 3, details of the gamma ray sensor 78 mentioned above are shown. A preferred gamma ray logging device comprising two gamma ray sensors 252a, 252b is shown along with an orientation sensor assembly 250. The orientation sensor assembly may include all the elements of the gyro-MWD device described above, but the some aspects of the method of the present invention may also be practiced with only orientation sensors such as accelerometers and or magnetometers. FIG. 3 also shows a processor 251 associated with the orientation/navigation sensor assembly. In a preferred embodiment of the invention, the primary purpose of the processor 251 is to process signals from the orientation/navigation sensor assembly 250. Also shown in FIG. 3 is a processor 254 associated with the gamma ray sensors. It should also be noted that for certain uses of the method of the present invention, only one gamma ray sensor may be sufficient.

In a preferred embodiment of the invention, two gamma ray detectors spaced 180° apart are used. When two detectors are used, the counts from the two may be combined.

In a preferred embodiment of the invention, the processors 251 and 254 operate at a clock frequency of approximately 60 Hz. The counts from the gamma ray sensor(s) are accumulated at a sample rate of 16.67 ms. This is done regardless of the actual rotation speed of the assembly. Other sample rates may be used, but a requirement is that it be fixed.

The "tick" size is defined as the change in the toolface angle over one time sample interval. The tick size increases with rotation speed and limits the resolution of the method and apparatus of the present invention. However, as discussed below, the effect of tick size can be substantially eliminated.

In a preferred embodiment of the invention, each detector has an intrinsic resolution of ±35°. This is determined by the shielding that is provided for the gamma ray detectors. In the method of the present invention, the data are binned into finite bins with a defined angular size, preferably 45°. The finite bin size further limits the angular resolution. Increasing the number of bins improves the angular resolution up to a point beyond which the poor statistics of gamma ray counts degrade the measurements.

Figure 4:
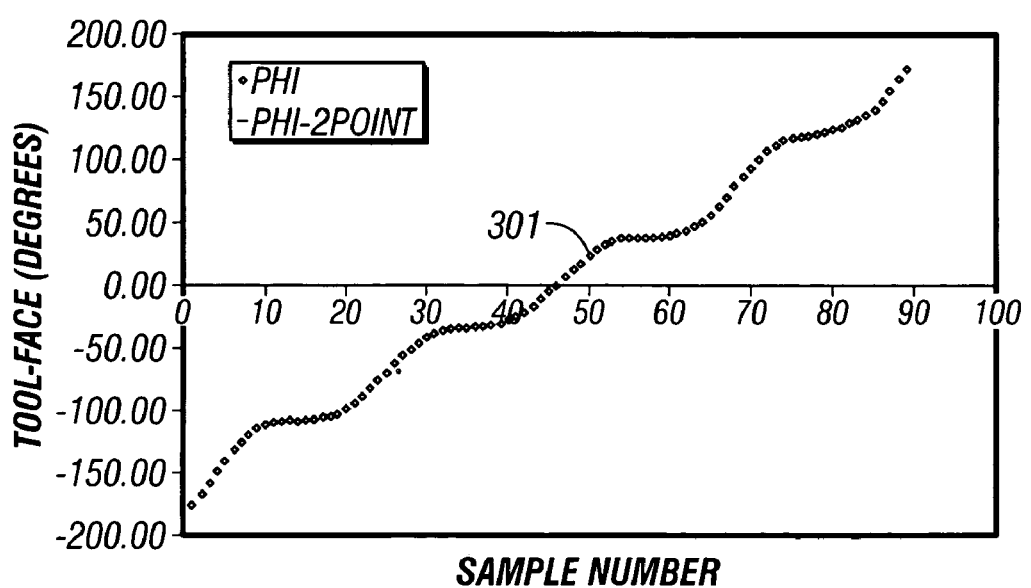
FIG. 4 shows the tool face angle as a function of time.

An important feature of the apparatus of the present invention is a common bus, designated generally as 260. The various processors (251 and 254 in FIG. 4) output their processed data to the bus. The bus is also connected to a telemetry device (not shown) at a suitable location for two-way communication with the surface controller and receiving data from the surface. In an alternate embodiment of the present invention, two-way communication between the bottom hole assembly and the surface controller may be accomplished using flowable devices carried by the drilling fluid. Such flowable devices are taught in U.S. Pat. No. 6,443,228) to Aronstam et al, having the same assignee as the present application and the contents of which are fully incorporated herein by reference.

The advantage of having a common bus 260 is that the processor 251 can process data from the orientation/navigation sensor independently of the processing of data from the gamma ray sensor(s) 252a, 252b by the processor 254. As would be known to those versed in the art, it is not uncommon for the rotation speed to be non-uniform. The processor 251 continues to process the data from the orientation sensor and outputs the toolface angle as a function of time to the bus 260. An advantage of having the common bus is that any additional directional evaluation devices could also operate independently of the orientation/navigation sensor assembly. As a result of this independent operation, a plot of the toolface angle as a function of sample number such as that shown in FIG. 4 may be obtained. The manner in which this is obtained is discussed next.

Figure 5:
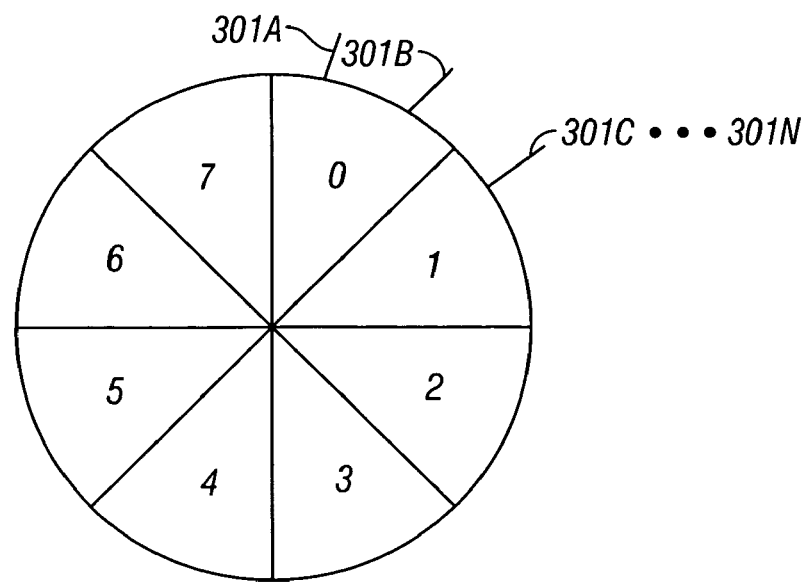
FIG. 5 shows an azimuthal display of time ticks.

Turning now to FIG. 5, eight sectors of tool face angles are shown, numbered 0, 1, 2, 3, 4, 5, 6 and 7. The use of eight sectors is optional and more or fewer sectors may be used. Also shown are ticks labeled as 301a, 301b, 301c... 301n. As noted above, the particular positions of the ticks are not known at the time the gamma ray sensor is making measurements—these are determined after the fact using information from the orientation sensors. The provide values of the toolface angle at discrete times. The toolface angle at intermediate times may be determined by interpolation; in a preferred embodiment of the invention, linear interpolation is used.

Figure 6:
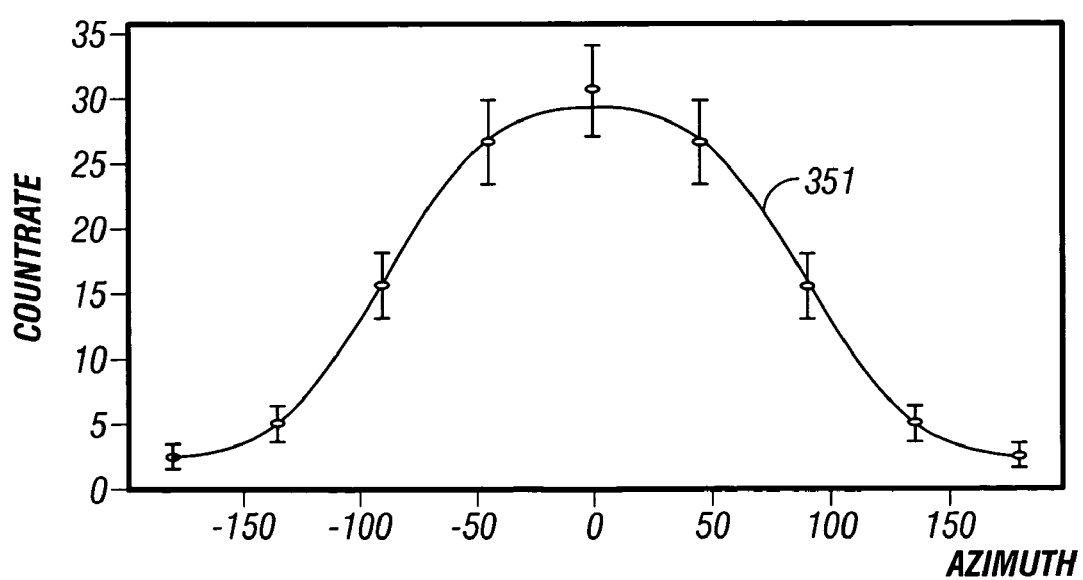
FIG. 6 illustrates the azimuthal resolution of an exemplary gamma ray directional logging tool.

There are a number of factors that limit the resolution of the method of the present invention in terms of tool face angle. The first limit is determined by the static resolution of the gamma ray sensors. The static resolution is the ability to resolve two point sources of gamma rays and is defined as the resolution that is achievable with an infinitely long acquisition time (i.e., so that statistical fluctuations are eliminated). FIG. 6 shows an example of a tool response function as a function of toolface angle. Typically, it is a Gaussian function with a half-width determined by the shielding provided for the detectors.

The actual resolution is obtained by convolving the static resolution with a bin window and the tick window; the actual resolution is thus poorer than the static resolution. Increasing the number of bins while maintaining the acquisition time $T_{acq}$ constant does not increase the overall resolution due to the fact that the statistical fluctuations within a bin become larger.

Figure 7:
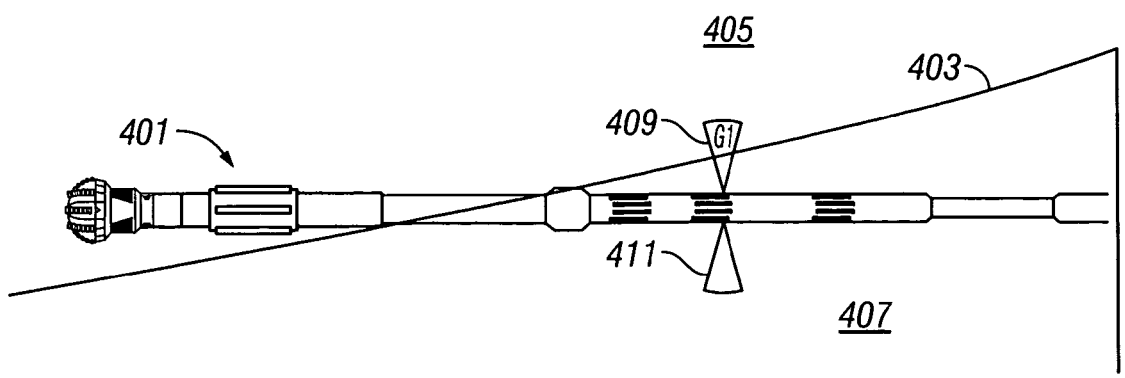
FIG. 7 illustrates the configuration of the apparatus of the present invention for determining relative angle with respect to a bed boundary.

Turning now to FIG. 7, an example of the use of the method of the present invention is shown. Shown is the apparatus of the present invention 401 including at least one gamma ray detector with region of sensitivity in the "up" and "down" direction shown by 409, 411. For simplifying the illustration, in FIG. 7 it is assumed that the normal to the boundary 403 between formations 405 and 407 lies in a vertical plane so that "up" and "down" directions in FIG. 7 correspond to a combination of sectors (0,7) and (3,4) in FIG. 5 respectively. The at least one gamma ray detector could comprise a pair of detectors. The data received by the at least one detector can then be processed to get gamma ray counts in the "up" and "down" directions respectively. When only one detector is use, then the combination of measurements from, say sectors 0 and 7 (see FIG. 5) is an "up" measurement while the measurements from sectors 3 and 4 give a "down" measurement. When two detectors are used, their respective measurements in the "up" and "down" directions may be combined to improve the signal to noise ratio.

The apparatus is shown crossing the bed boundary 403 between two earth formations 405, 407. For illustrative purposes, assume that formation 405 comprises a shale while 407 comprises a sand. For the configuration shown, the "up" gamma ray count will be greater than the "down" gamma ray count. The increased count is due to the fact that the gamma ray sensors have a limited azimuthal sensitivity and the potassium present in the shale is a significant source of gamma rays.

Figure 8:
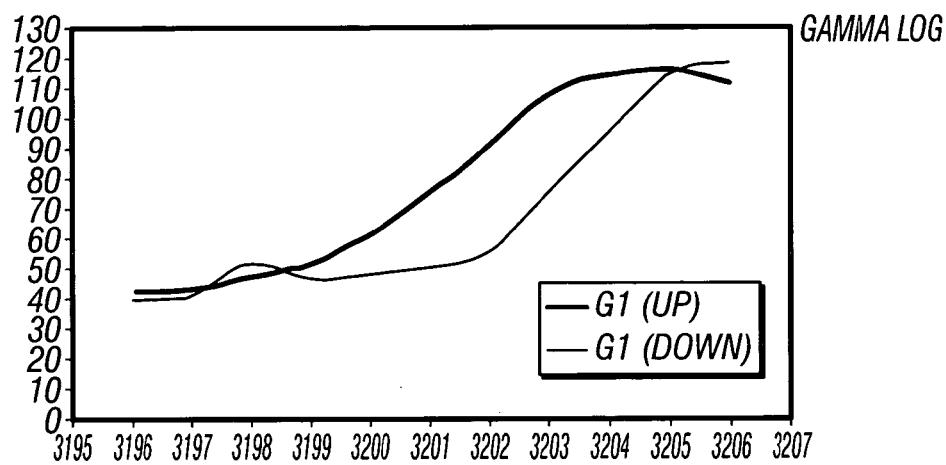
FIG. 8 illustrates the directional measurements made by the apparatus as shown in FIG. 7.

By measuring both the "up" and "down" gamma ray counts as a function of depth, a plot shown in FIG. 8 results. Shown are the measurements made by the "up" and "down" gamma ray sensors. The abscissa is the borehole depth (actual depth, not true vertical depth) and the ordinate is the gamma ray count. In an optional embodiment of the invention, the rate of penetration (ROP) of the assembly in the borehole is determined using signals from the axial component accelerometer. Such a method is disclosed in U.S. patent application Ser. No. 10/167,332 of Dubinsky et al, filed on 11 Jun. 2002 and the contents of which are fully incorporated herein by reference. However, any suitable method for determining the ROP may be used.

The horizontal separation between the two curves is an indication of the relative angle at which the borehole crosses the bed boundary: the larger the separation, the smaller the angle. Using knowledge of the tool response function, this angle can be determined.

In general, however, bed boundary may have an arbitrary orientation and the maximum gamma ray count need not correspond to the "up" direction of the tool (sectors 0,7 in FIG. 5). The gamma ray count $\Psi$ in a deviated borehole as a function of the toolface angle $\phi$ can be approximated by the function $$\Psi^M \approx \sum_{m=0}^{M} \Psi_m \cos[m(\phi - \phi_0)] \quad (1)$$

Such a function satisfies two requirements of the gamma ray count: it must be a periodic function with a period of 360°, and it must be symmetric with respect to the angle $\phi_0$ which is the toolface angle at which the detector is closest to a bed boundary. Note that the example of FIGS. 7 and 8 is a special case when the normal to the bed boundary is in a vertical plane. It should also be noted that proximity to a bed boundary is not the only cause that will produce a variation of the form given by eq. (1); a similar results follows from a radial fracture extending out from the borehole.

To reconstruct the distribution with M terms, it is necessary to have the number of bins of data $N_{bins} > 2(-1)+1$. Hence to determine a three term expansion in eq. (1), at least 5 bins are necessary.

Figure 9:
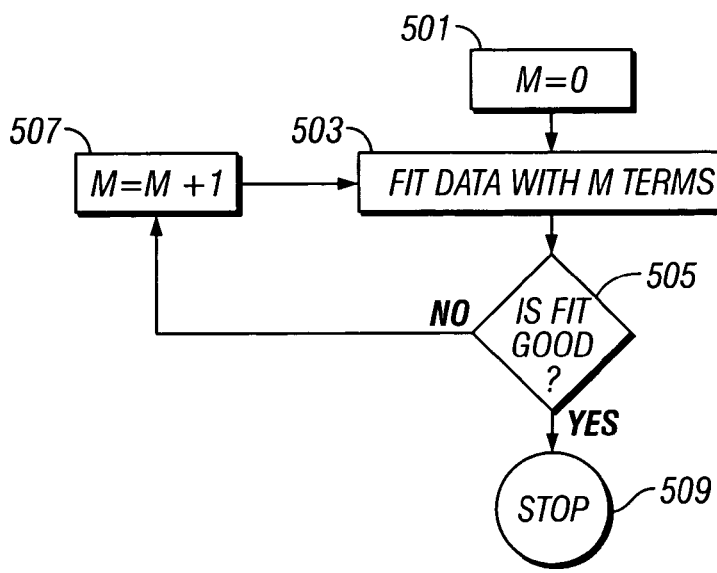
FIG. 9 illustrates a flow chart of the method used for characterizing the toolface-angle dependent data in a series expansion.

Turning next to FIG. 9, the method of the present invention is illustrated by the flow chart. Starting at 501, a model with M=0 is defined, i.e., there is no variation with toolface angle of the gamma ray count. This corresponds to a model in which $$\Psi = \text{Const} = \Psi_0 \quad (2)$$

A check is made to see if, based on the number of data points, the observations can be adequately described by a constant 505 to within a defined probability. If the answer is "yes", then the process terminates and there is no variation with toolface angle of the data.

If the answer at 505 is "No", then M is incremented 507 and a two term expansion is made. This requires determination of the angle $\phi_0$. A first estimate of the angle $\phi_0$ is obtained as the average of the data $$\hat{\phi}_o = \frac{\sum_{k=1}^{N_{bins}} n_k \phi_k}{\sum_{k=1}^{N_{bins}} n_k}. \quad (3)$$

The data are then rotated about the angle estimated from eq. (3) and a two term fit is made to obtain $\Psi_0$ and $\Psi_1$ according to eq. (1). Keeping these determined values of $\Psi_0$ and $\Psi_1$, a new estimate of $\phi_0$ is made. A check is again made of the goodness of fit 505 and again, if the fit is good enough the process terminates 509 and if the fit is not good enough, an additional term is added to the curve fitting.

In order to improve the statistics on the measurements, averaging of the measurements over a depth window may also be used. As noted above, the method of Dubinsky discloses a method of using an axial accelerometer for determining the depth of the tool In the present invention, the method of Dubinsky is preferred for determining the depth of the assembly and defining the depth window over which averaging may be done, although other methods for depth determination may be used.

In most situations, gamma ray data will not have the necessary resolution to use the higher order terms of the expansion given by eq. (1). Hence in a preferred embodiment of the invention, only a single term of the expansion given by eq. (1) is used. The method illustrated in FIG. 9 may be used for processing of image data. This is illustrated in FIGS. 10a, 10b.

Shown in FIG. 10a are raw data acquired downhole. The vertical axis represents time (or depth) and the horizontal axis shows the sectors. In this particular example, eight sectors were used. The display may be a color display or may be a black and white display of the gamma ray counts as a function of time (or depth) and the azimuth (sector). Following the curve fitting (using the cosine distributions as discussed above) of the data at a selected time (or depth), partially processed data (and a partially processed image), not shown, may be obtained. The partially processed data are than low pass filtered in the vertical direction (time or depth). The filtered image may be quantized into different levels and the resulting image displayed on a color display or a gray scale. This may be referred to as a processed image. An example of this is shown in FIG. 10b. Also shown in FIG. 10b are contours such as 601a, 601b, 601c . . . 601n. In a display such as FIG. 10b, these contours represent dipping boundaries that intersect the borehole at an angle.

The method of the present invention has been discussed above with respect to a gamma ray logging tool. However, the method of the present invention may also be used with any kind of logging tool having a sensitivity that is dependent upon the toolface angle. This includes resistivity sensors with transverse induction coils such as that described in U.S. Pat. No. 6,147,496 of Strack et al. A plurality of directional sensors may be used, each of which preferably has its own associated processor connected to the common bus.

The method of the present invention may also be used with wireline logging tools. When used with wireline tools, a motor is needed for rotating the assembly through different toolface angles so as to provide adequate sampling over the circumference of the borehole. The wireline tools may be run open hole or, in case of certain types of sensors such as gamma ray sensor, in cased hole. A slickline sensor assembly may also be used within a drillstring for some types of measurements.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of determining a parameter of interest of a medium proximate to a borehole using a rotating downhole assembly in said borehole, the method comprising:
   (a) obtaining information about a tool-face angle of the assembly during rotation thereof;
   (b) using a directionally sensitive evaluation device for making measurements indicative of the parameter of interest, said measurements being obtained separately over a plurality of time intervals; and
   (c) representing the directionally sensitive measurements by a series expansion that includes a sinusoidal variation with the toolface angle.

2. The method of claim 1 wherein obtaining said information about said tool face angle further comprises:
   (i) using a navigation assembly including a first sensing device that is at least I one of (A) a gyroscope, (B) a magnetometer, and, (C) an accelerometer, for providing a measurement indicative of said toolface angle; and
   (ii) using a processor associated with the navigation assembly for determining said toolface angle over said time intervals.

3. The method of claim 2 wherein said rotating downhole assembly further comprises a drill bit for penetrating a formation, the method further comprising using at least one of (I) said gyroscope, and, (II) an accelerometer, for determining a rate of penetration (ROP) of said downhole assembly.

4. The method of claim 1 wherein said series expansion further includes a sinusoidal variation of twice said tool face angle.

5. The method of claim 1 wherein said directional evaluation device further comprises at least one gamma ray detector.

6. The method of claim 4 wherein the at least one gamma ray detector further comprises a pair of gamma ray detectors on substantially opposite sides of the downhole assembly.

7. The method of claim 5 further comprising using a drill bit coupled to the downhole assembly for penetrating a formation and using measurements from said at least one gamma ray detector for determining a relative inclination of the borehole to a formation boundary.

8. The method of claim 6 further comprising using a drill bit coupled to the downhole assembly for penetrating a formation and using measurements from said pair of gamma ray detectors for determining a relative inclination of the borehole to a formation boundary.

9. The method of claim 1 wherein said directional evaluation device further comprises a resistivity device.

10. The method of claim 1 wherein said directional formation evaluation device further comprises a density measurement device.

11. The method of claim 1 further comprising using a processor for determining from said series expansion an indication of proximity to a bed boundary in the subsurface formation.

12. An apparatus for determining a parameter of interest of a medium proximate to a borehole; the apparatus comprising:
   (a) a bottomhole assembly (BHA)conveyed in the borehole;
   (b) an orientation sensor which obtains information about a tool-face angle of he BHA during rotation thereof;
   (c) a directionally sensitive evaluation device which obtains measurements indicative of the parameter of interest; and
   (d) a processor which representing the directionally sensitive measurements by a series expansion that includes a sinusoidal variation with the toolface angle.

13. The apparatus of claim 12 further comprising a drilling tubular which conveys the BHA into the borehole.

14. The apparatus of claim 12 wherein the orientation sensor is selected from (i) a gyroscope, (ii) a magnetometer, and (iii) an accelerometer.

15. The apparatus of claim 12 wherein the directionally sensitive evaluation device is selected from (i) a gamma ray detector, and (ii) a resistivity sensor.

* * * * *